Figure 1:
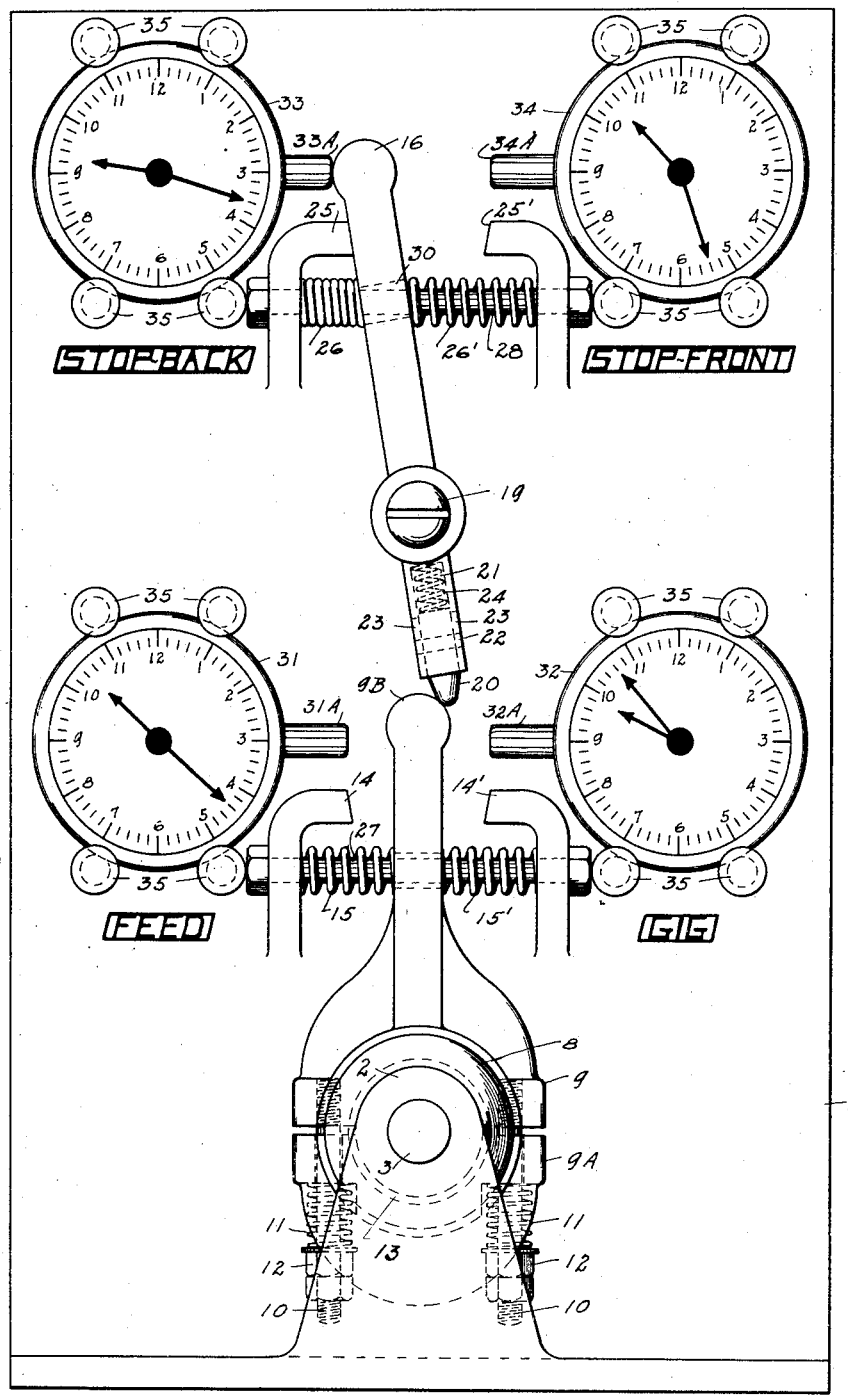

July 7, 1931.  E. G. STACK  1,813,777
OPERATION METER
Filed March 6, 1928  4 Sheets-Sheet 1

July 7, 1931. E. G. STACK 1,813,777
OPERATION METER
Filed March 6, 1928 4 Sheets-Sheet 3
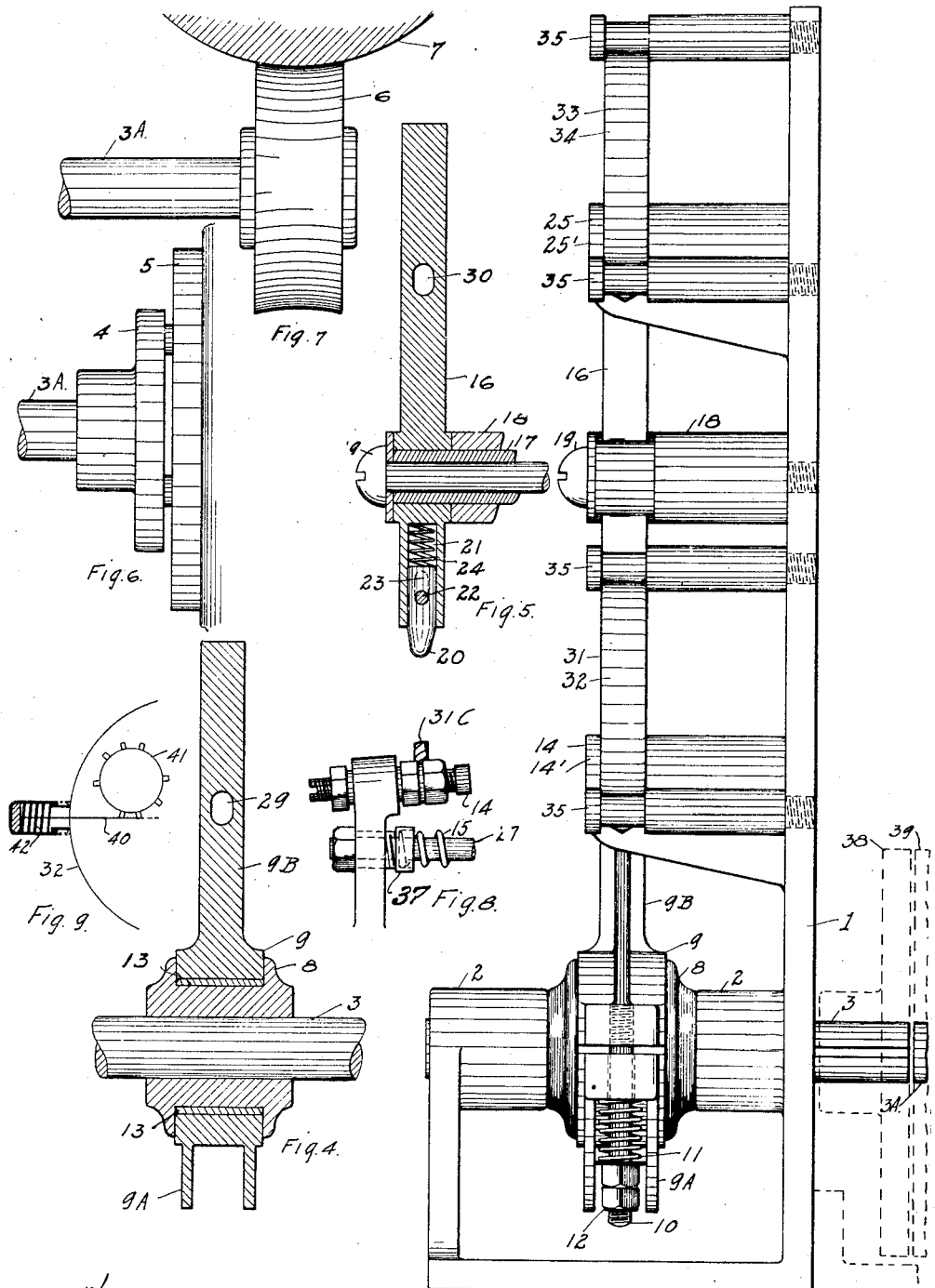

July 7, 1931.  E. G. STACK  1,813,777
OPERATION METER
Filed March 6, 1928   4 Sheets-Sheet 4

Patented July 7, 1931

1,813,777

UNITED STATES PATENT OFFICE

EMMET G. STACK, OF MARSHFIELD, OREGON

OPERATION METER

Application filed March 6, 1928. Serial No. 259,511.

My invention relates to an operation meter which will enable anyone to read at a glance, and without having to make computations, the total time consumed in each of the several separate movements and stops of a machine being metered from a starting period up to the time the readings are taken. It relates to an operation meter which will permit the operations of a machine being metered to be viewed at any number of places distant from the actual operation. It relates to an operation meter which may receive its source of power from either a rotative mechanism or a sliding mechanism of the machine being metered.

I have in mind a sawmill carriage whose operation involves a feed movement, a return movement, a stop in front of the saw while loading and turning logs, and a stop in back of the saw while dropping cants or waiting for the rolls to clear. A logging operation may be considered wherein a line goes out in the woods then stops while hitches are made to the logs which are then hauled in to the spar tree where another stop is made while the logs are being released. Edgers and veneer lathes may be cited as being machines of a two operation type, or those in which the movement is in one direction with stops interspersed. While I mention these machines I do not confine the use of my meter to them, but merely mention them now due to using them later on for further description.

The earning capacity of a machine is governed by its productive movements, as for instance, the feed movement of the sawmill carriage. About seventy-five per cent of the working day is consumed in unproductive movements and stops, in other words the carriage is only in the cut two hours out of the eight. With my meter the management has the results of operations before it at any moment and is in position to locate leaks immediately after they occur. A constant, accurate, and indisputable check on operations tends to increase the output and maintain a high average. Adjustments can be made before the day is over and it is too late. Computations do not have to be made, results being readable at a glance. There is no labor required in trying to make estimates from graphs. The results are comparable to an up to the minute balance sheet whereby the management is enabled to keep its fingers on the pulse of the business yet giving its time to more important matters than reviewing journals and ledgers. Accurate results are available for comparison from day to day and thus the efficiency of the plant may be checked.

My invention relates to a device in which, as an example, the movements and stops of a sawmill carriage are transmitted thru suitable means to a meter shaft and in turn to a spring clutch which by its own movements directly and indirectly thru an auxiliary arm brings into operation, successively, suitable time indicating means corresponding to the particular movement or stop; a device in which an electric circuit may be closed simultaneously with the starting of a particular time indicating means thus bringing into operation similarly designated time indicating means at any number of distant points so that the carriage operations may be kept under observation by interested parties at these points distant from the actual operation.

I attain these objects by the mechanism illustrated in the accompanying drawings, in which—

Figure 2:
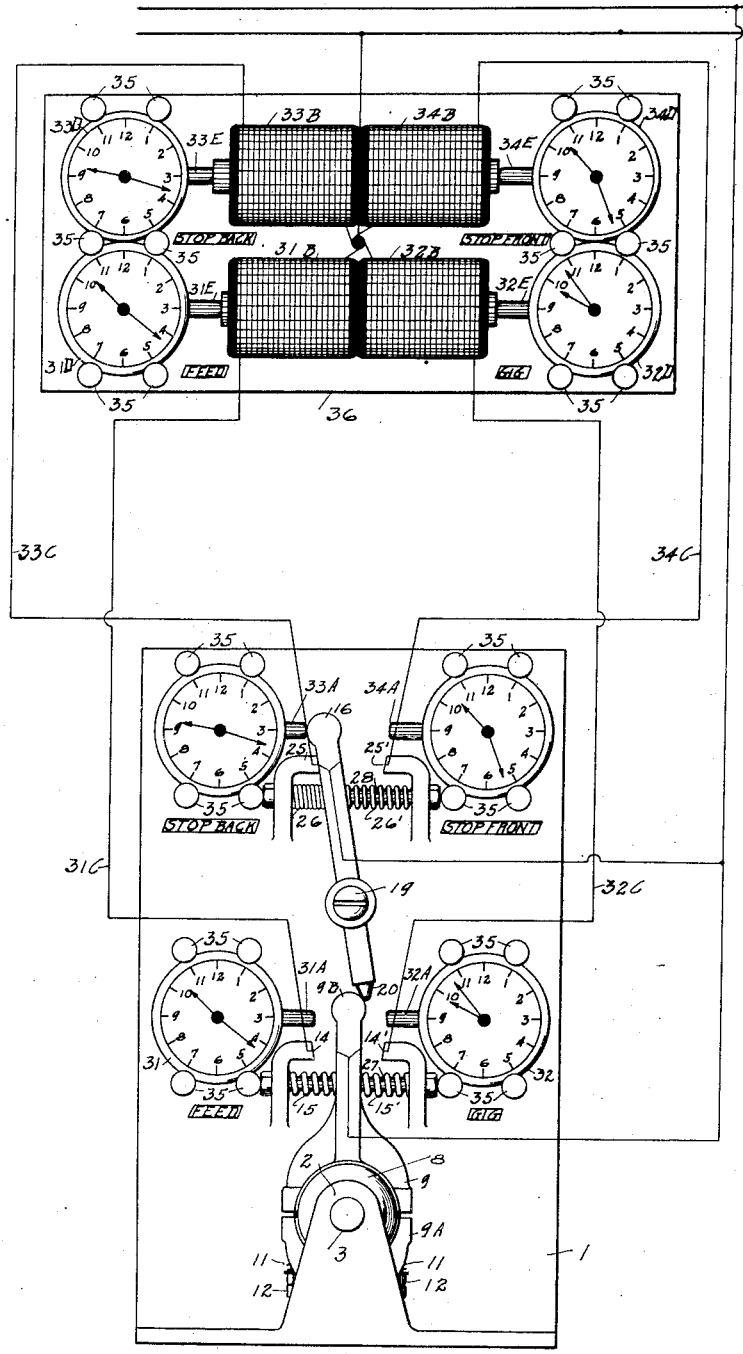
Figure 10:
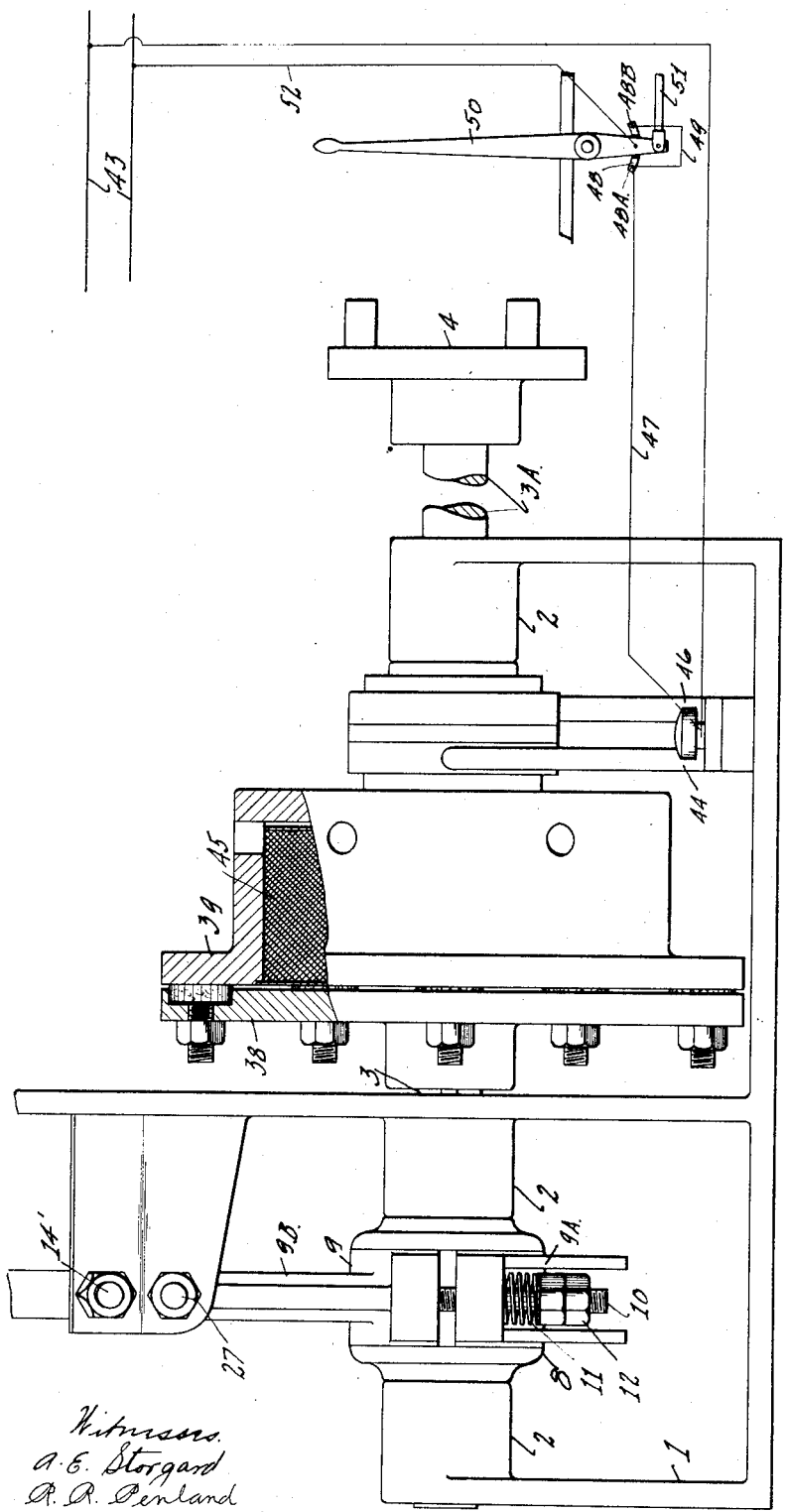

Fig. 1 is a plan view; Fig. 2 is a plan view showing the device transferring its movements and stops thru electric circuits to distant similar time indicating means as watches; Fig. 3 is a side view; Fig. 4 is a section thru the spring clutch parallel to the shaft; Fig. 5, is a section thru the auxiliary arm on a line parallel to the shaft; Fig. 6 shows one method of transferring the movements of a rotative shaft of a machine to the device; Fig. 7 shows a method of transferring the movements of a sliding rod, or other means as a cable, to the device; Fig. 8 shows the stop or contact points made adjustable; Fig. 9, shows a section thru one type of watch plug; Fig. 10 shows the magnetic clutch circuit controlled by a sawyer's lever.

Similar numerals refer to similar parts thruout the several views.

In illustrating my invention I have not attempted to show all the possible details that might be changed in my meter without departing from the basic idea.

In Fig. 6 the rotative movements of the shaft 5 of a machine are transmitted to the shaft 3A by the driving coupling 4. In Fig. 7 the sliding movement of the piston rod 7 of a steam feed transfers its movements thru the friction disc 6 to the shaft 3A. It can be seen that a chain, belt, or gear drive might be used to transfer the movement and stops of a machine to the shaft 3A. Fig. 3 shows the meter shaft in two sections, the break being made just beyond the base plate 1, with a clutch connecting the two sections. The meter section of shaft 3 is journalled in the bearings 2 of the base plate 1. The flanged sleeve 8 is secured to the shaft 3 in any suitable manner. The sleeve 8 absorbs the wear and may be easily replaced. It presents a greater gripping surface for the spring clutch 9 thus permitting the use of a smaller shaft 3. The flanged sleeve 8 prevents the lateral movement of the spring clutch 9. A larger shaft 3 may be used and the bearings 2 used to collar the spring clutch 9. The spring clutch is composed of two main parts, the body member 9 which is extended to form the arm 9B, and the cap 9A which is secured to the body member 9 by the studs 10. The grip on the sleeve 8 by the spring clutch is regulated by the coil springs 11 inserted between the cap 9A and the nuts 12 on the studs 10. A renewable friction lining, as 13, may be used to save the spring clutch members from replacement. Under ordinary conditions the spring clutch would grip the sleeve 8 and turn with the shaft 3 when it was rotated, but in this case its travel is limited by the clutch arm 9B coming in contact with either the stop 14 or 14' depending upon the direction of rotation of the shaft 3. When the clutch arm 9B strikes either the stop 14 or 14', the clutch slips on the sleeve 8 secured to the rotating shaft 3. The clutch arm 9B is held against the stop 14 or 14' during the rotation of the shaft 3, but immediately the shaft 3 is stopped the spring 15 or 15', whichever was compressed by the clutch arm 9B, causes the clutch arm 9B to be centered. This action of the spring 15 or 15' is permitted by the releasing of the armature 38, slidably secured to the shaft 3, from the grip of the magnet section 39, of a magnetic clutch, secured to the adjacent end of shaft 3A, which, being connected to the moving parts of the machine being metered, rotates with it and stops with it. The electric circuit for energizing the magnetic clutch has been illustrated in Fig. 10, and the means for its control. The circuit is adaptable to be closed or opened in unison with the starting or stopping of the machine and so the magnet section 39, being energized as it starts to rotate in either direction, grips the armature 38 to it and the shaft 3 is rotated with shaft 3A. In a sawmill carriage hook-up the sawyer's lever, which controls the twin engine or steam feed valves, opens and closes the circuit for energizing the magnetic clutch at the same time the valves are opened or closed. Fig. 10, showing the control of the circuit supplying the magnetic clutch is used only for illustration. The source of power may be from any suitable means, in this case from a line 43 and is delivered to the brush 44 communicating with the magnet section 39 and thence thru the coil 45 and out thru the brush 46 and the switch leg 47 to point 48A of the switch 48 which in turn is connected to the opposite point 48B by the connection 49. The sawyer's lever 50 is adapted to control the means for the operation of the carriage thru the connection 51. The sawyer's lever 50 is connected to the line 43 by the connection 52 and in such a manner as to make the magnetic clutch controlling circuit when the lever 50 is moved from its normally central off position. In a logging operation hook-up the clutch levers which throw the drums into or out of gear usually control the magnetic clutch circuit. Any suitable means might be employed whereby the shafts 3 and 3A might be connected or disconnected in unison with the starting or stopping of the machine or its parts being metered. The clutch may be of any suitable type operable to fulfill the conditions enumerated above. The auxiliary arm 16 is operable to turn about the pivot spindle 17 on a bearing suitably located between its extremes. Fig. 5 shows a spreader 18 forming a support for the auxiliary arm 16, and a support for the pivot spindle 17, confined within it. The auxiliary arm 16 and its spindle 17 are secured to the base plate 1 by the bolt 19. The bolt 19 might also be used as the spindle. On the bottom of the auxiliary arm 16 is located the latch 20 slidably confined in the socket 21 by the stop pin 22 slidable in the slots 23. The spring 24 tends to hold the latch 20 outwardly and presents a resistance against its being forced inwardly although permitting it to be yieldable to sufficient force. The latch 20 might be inserted in the top of the clutch arm 9B. Whenever the clutch arm 9B is centered from either side it comes in contact with the latch 20. This action moves the bottom of the auxiliary arm 16 off its central position in order to give place to the centered clutch arm 9B. When the bottom of the auxiliary arm 16 moves in one direction the top moves in the opposite direction and against the stop 25 or 25' and, in so doing, compresses either the spring 26 or 26'. The springs 26 or 26' act as a means for centering the auxiliary arm 16 when the pressure on its lower end is released by the action of the clutch arm 9B moving toward and against either of its stops 14 or 14'. The stops 14, 14', 25, and 25' may be made adjustable as shown in Fig. 8. The springs 15 and 15' and the springs 26 and 26' are confined to their places by the rods 27 and 28 which pass thru the slotted holes 29 and 30 in the clutch arm 9B and the auxiliary arm 16 respectively. The tension in the springs 15, 15', 26, and 26' may be equalized by the adjusting nuts 37 shown in Fig. 8.

The watches, illustrated in Fig. 1, are shown secured to the base plate 1 by the studs 35 and in a similar manner are those shown with the base 36. Any suitable means might be employed to hold and secure the watches or other time indicating or recording means. In the illustrations watches similar in appearance to ordinary watches are shown, but it can be seen that a time recording watch could be used and a record written by the watch hands could be had, or again, a clock similar to a watchman's clock could be used and the time punched at the end of any desired period. Fig. 9 shows a method whereby the watches or other time indicating means may be stopped and started by stopping and starting the balance wheel directly. The fine wire 40 secured to the watch plug as 31A, 31E, etc., is thrown into or out of contact with the balance wheel 41 to stop or start a watch. During the period the registering means is in contact with any watch plug the wire 40 is out of contact with the balance wheel 41 and the watch runs and whenever the pressure of the registering means is removed from the watch plug the spring 42 causes the wire 40 to come into contact with the balance wheel 41 and the watch stops. If the watch plugs were made operable by magnets or solenoids solely the spring 42 could be adapted to bring the wire 40 either into or out of contact with the balance wheel 41, in other words either a pull or push action of the plugs could be had and used. The watches 31 and 32 are operable directly by the clutch arm 9B as it comes in contact with the stops 14 or 14' depending on the direction of the rotation of shaft 3, while the watches 33 and 34 are operable indirectly by the clutch arm 9B acting thru the auxiliary arm 16 when the same comes in contact with the stops 25 or 25'. Whenever it is desired to operate an auxiliary complement of watches at distant points electric circuits as 31C, 32C, 33C, and 34C, are closed at the same time contacts are made by the clutch arm 9B or the auxiliary arm 16 with any of their respective stops. Thru the closing of these circuits the solenoids as 31B, 32B, 33B, or 34B are energized and similarly designated watches as 31D, 32D, 33D, or 34D come into operation. Fig. 2 shows this very clearly. It can be seen that if it were desirable the watches could be left off the base plate 1 and the clutch arm 9B and the auxiliary arm 16 only used to make and break the electric circuits for the operation of the watches at distant points as has been described. Electrical contacts are shown made at the stops 14, 14', 25, and 25', but it is possible to make them at other points. The design and position of the stops might be varied and even the time indicating means be made adaptable to form suitable stops or contact points. It is possible to use flat springs in lieu of coil springs.

I shall now assume that the meter has been suitably connected to meter a sawmill carriage operation, that 8 a. m. was the beginning of the working period and 5 p. m. the time the readings were taken, and that the meter was stopped over the noon period, which might be accomplished by centering both arms. It will be noted that watches in both complements register the same. The feed watch reads 10.22 which means that two hours and twenty-two minutes were consumed while the carriage was in the cut. In a like manner all four watches of a complement may be read and the amount of their readings will be found to total eight hours or the time elapsed from the starting period to the reading time. With the arrangement shown in Fig. 2, it is very hard to tamper with the meter.

Fig. 1 and Fig. 2 both show the carriage stopped back of the saw. If the next movement of the carriage was to gig, the clutch arm 9B would swing over against the stop 14' forcing the latch 20 inwardly as it went by it. The compressed spring 26 would then center the auxiliary arm 16. When the sawyer stops the carriage in front of the saw to lead or turn a log he also opens the electric circuit supplying the magnetic clutch thereby permitting the armature 38 to be freed from the grip of the magnet section 39, and the spring 15', compressed by the movement of the clutch arm 9B against the stop 14', to center the clutch arm 9B which, upon coming to a central position, would move the bottom of the auxiliary arm 16 out of its way in one direction while the top swung over against the stop 25' compressing the spring 26'. If the next movement was to feed, the clutch arm 9B would force the latch 20 inwardly and go by it and up against the stop 14 and in so doing would compress the spring 15, while the compressed spring 26' would return the auxiliary arm 16 to a central position. The watches that indicate the time consumed in the various movements and stops would come into operation as contacts were made and similarly designated watches would be operated simultaneously by the closing of their respective circuits.

The various movements and stops made by a sawmill carriage, for an instance, may run into the thousands daily but my meter makes it possible to classify and measure them all and give the totals of each classification immediately. The meter may be run at a speed that will practically eliminate losses of time due to operation, the centering springs effecting a smooth cushioned action at high speed.

The meter that I have thus far described will work under all conditions, and being a four operation meter it will of course meter a two operation machine such as the edger and veneer lathe. If a meter was to be built to register both the movements and stops of a two operation machine it could be arranged so as to register the stops upon the centering of the clutch arm 9B, although this would not be necessary because the stops would be the difference between the movements and the time elapsed at the reading.

Having described my invention, what I claim is:

1. In an operation meter, in combination, movement-indicating means; a drive for the meter from the machine being metered; a mechanism for disabling the drive during the stops of the machine; a spring clutch operated by the drive to bring the movement-indicating means into operation during the movements of the machine; means operable to bring the spring clutch to an off position when the machine stops.

2. In an operation meter, in combination, movement-indicating means; a controlling circuit which is operable to start and stop the movement-indicating means; a drive for the meter from the machine being metered; a mechanism for disabling the drive during the stops of the machine; a spring clutch operated by the drive to make the movement-indicating means controlling circuit during the movements of the machine and adaptable to break the circuit during the stops of the machine.

3. In an operation meter, in combination, stop-indicating means; movement-indicating means; a drive for the meter from the machine being metered; a mechanism for disabling the drive during the stops of the machine; a spring clutch operated by the drive to bring the movement-indicating means into operation during the movements of the machine, and adaptable to bring the stop-indicating means into operation during the stops of the machine.

4. In an operation meter, in combination, movement-indicating means; stop-indicating means; a controlling circuit which is operable to start and stop the movement-indicating means; a controlling circuit which is operable to start and stop the stop-indicating means; a drive for the meter from the machine being metered; a mechanism for disabling the drive during the stops of the machine; a spring clutch operated by the drive to make the movement-indicating means controlling circuit during the movements of the machine, and adaptable to break the said circuit during the stops of the machine and make the stop-indicating means controlling circuit.

5. In an operation meter, in combination, stop-front indicating means; stop-back indicating means; forward-movement indicating means; backward-movement indicating means; a drive for the meter from the machine being metered; a mechanism for disabling the drive during the stops of the machine; a spring clutch operated by the drive to bring the associated movement-indicating means into operation during that particular movement of the machine; means operable to bring the spring clutch to a central position when the machine stops; a lever arm engageable with the spring clutch when it is in a central position and adaptable to bring the associated stop-indicating means into operation during that particular stop of the machine; means operable to bring the lever arm to a central position when the machine starts.

6. In an operation meter, in combination, movement-indicating means; stop-indicating means; a drive for the meter from the machine being metered; a mechanism for disabling the drive during the stops of the machine; a spring clutch operated by the drive to bring the movement-indicating means into operation during the movements of the machine; means operable to bring the spring clutch to a central position when the machine stops; a lever arm engageable with the spring clutch when it is in a central position and adaptable to bring the stop-indicating means into operation during the duration of the stop; and means operable to bring the lever arm to a central position when the machine starts.

7. In an operation meter, in combination, movement-indicating means; stop-indicating means; a controlling circuit which is operable to start and stop the movement-indicating means; a controlling circuit which is operable to start and stop the stop-indicating means; a drive for the meter from the machine being metered; a mechanism for disabling the drive during the stops of the machine; a spring clutch operated by the drive to make the movement-indicating means controlling circuit during the movements of the machine; means operable to bring the spring clutch to a central position to break the circuit when the machine stops; a lever arm engageable with the spring clutch when it is in a central position and adaptable to make the stop-indicating means controlling circuit during the stops of the machine; and means operable to bring the lever arm to a central position to break the circuit when the machine starts.

8. In an operation meter, in combination, stop-front indicating means; a controlling circuit which is operable to start and stop the stop-front indicating means; stop-back indicating means; a controlling circuit which is operable to start and stop the stop-back indicating means; forward-movement indicating means; a controlling circuit which is operable to start and stop the forward-movement indicating means; backward-movement indicating means; a controlling circuit which is operable to start and stop the backward-movement indicating means; a drive for the meter from the machine being metered; a mechanism for disabling the drive during the stops of the machine; a spring clutch operated by the drive to make the associated movement-indicating means controlling circuit during that particular movement of the machine; means operable to bring the spring clutch to a central position to break the circuit when the machine stops; a lever arm engageable with the spring clutch when it is in a central position and adaptable to make the associated stop-indicating means controlling circuit during that particular stop of the machine; means operable to bring the lever arm to a central position to break the circuit when the machine starts.

9. In an operation meter, in combination, stop-indicating means; a drive for the meter from the machine being metered; a mechanism for disabling the drive during the stops of the machine; a spring clutch operated by the drive from a normally operative to an inoperative position during the movements of the machine, and means operable to bring the spring clutch back into engagement with the stop-indicating means when the machine stops and thus permit them to come into operation during the period of said stop.

10. In an operation meter, in combination, stop-indicating means; a controlling circuit which is operable to start and stop the stop-indicating means; a drive for the meter from the machine being metered; a mechanism for disabling the drive during the stops of the machine; a spring clutch operated by the drive from a normally operative to an inoperative position during the movements of the machine, and means operable to bring the spring clutch back to make the stop-indicating means controlling circuit during the stops of the machine.

Signed at Marshfield, in the county of Coos and State of Oregon, this 6th day of May, 1929.

EMMET G. STACK.